3,718,269
DRIVING DEVICE PROVIDED WITH CONTROL SYSTEM
Hans H. Glaettli, 252 Seestrasse,
CH 8700 Kusnacht, Switzerland
Filed Apr. 16, 1970, Ser. No. 29,201
Claims priority, application Switzerland, Apr. 24, 1969,
6,219/69
Int. Cl. B65h 23/18
U.S. Cl. 226—33                                  25 Claims

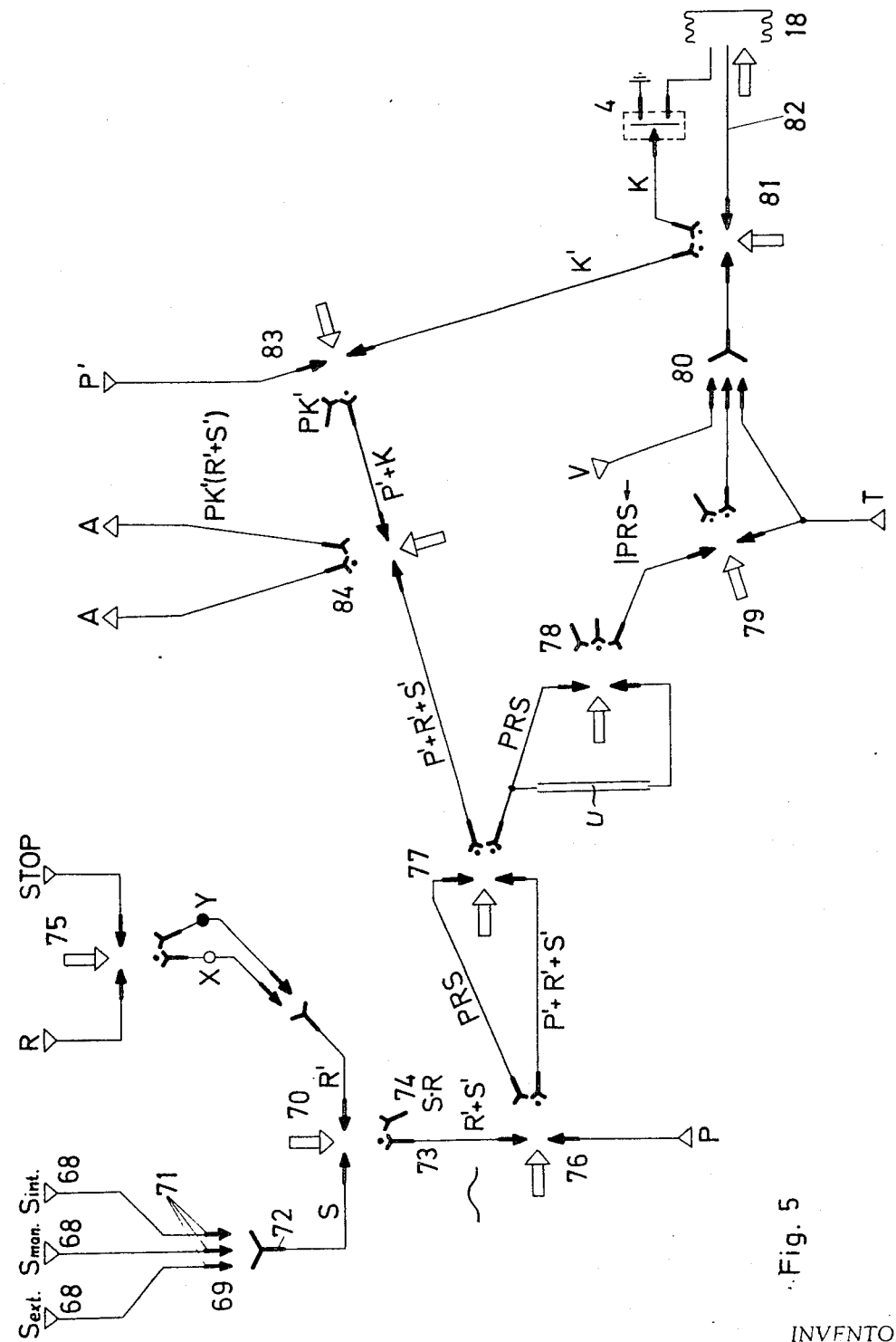

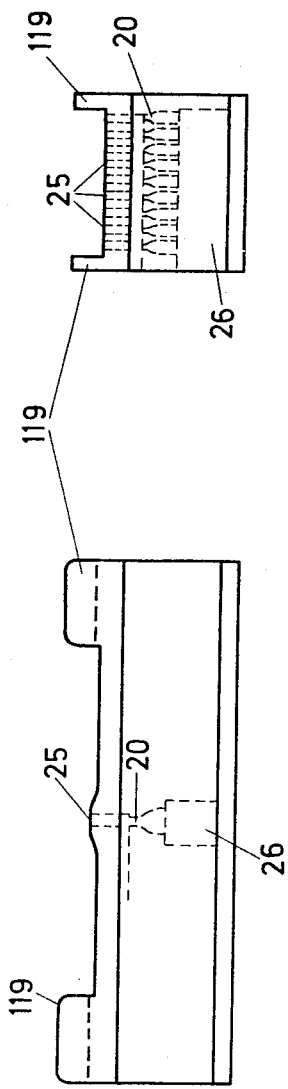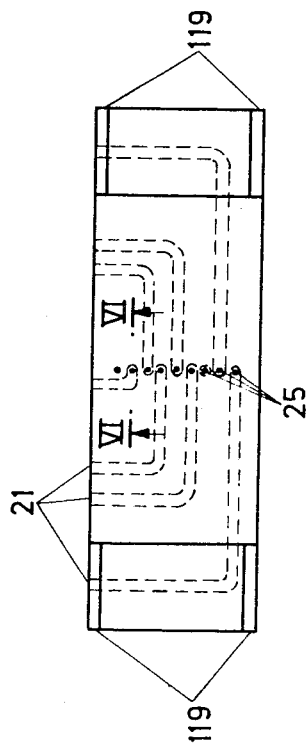

ABSTRACT OF THE DISCLOSURE

A driving device with a control system and designed for tape or disk stored information media utilizing a fluidic sensing means for controlling actuation means for engaging and/or disengaging the drive of the information medium.

---

The present invention concerns a driving device provided with a control system and designed for information media having the form of tapes or disks.

In contrast with rapid-working large-scale computer systems, there are many industrial applications possible in which the flow of information is limited mainly by mechanical delivery units, and often also by manual feed-in. In such cases it is possible generally without difficulties to control digital systems by mechanical, electromechanical and in particular pneumatic-fluidic punched-tape readers. The last-mentioned version is especially recommended in cases where pneumatic delivery units have to be controlled and the feed-in problem is already solved.

In the known mechanical and electro-mechanical tape readers, reading of the tape is effected by means of brushes, pins or special small sprockets mounted in a pivoted arm. The power transmission required for feeding along is mostly effected by special sprockets, more rarely by toothed bars. Although the mechanical engagement in reading endangers particularly the narrow webs between the information holes and the blanks, reading errors are still mostly due to damage in the feed track. For, as is known, the track also has the function of preventing any reading of the tape in intermediate positions (e.g., during feed), and this is no longer ensured when holes are enlarged or torn, for instance.

By the simultaneous engagement of several teeth, the forces acting on the paper strip can be distributed over a larger area, and by the use of a maltese cross transmission or some other device producing a smooth motion it is possible greatly to reduce the high peak values which otherwise arise. However, the possibility of reducing the thrust stresses destroying the tape is relatively closely limited, because the number of simultaneously engaging teeth cannot be increased beyond obvious limits: tolerances are inevitable in the manufacture of the sprockets and toothed bars and also in the punching of the tape, besides variations in the tape owing to absorption or evaporation of moisture, temperature changes and mechanical action (e.g. stretching). If too high a number of teeth were adopted for the purpose of distributing over a maximum area the forces acting on the tape, the dimensional variations due to the causes mentioned would add up to such an extent that not only would the area taking the forces no longer increase, but the tape would also become subject to new, yet considerably stronger and more rapidly increasing forces. So, instead of saving the tape, such an arrangement would merely speed up the destruction thereof.

Another disadvantage of the concurrent use of the feed track as a rack and a signal medium for determining the suitable reading position is found in the piecing-up of tapes: Piecing-up must be done in such a way that the feed track continues without pitch errors or can be supplemented. Especially when adhesive tape is used for piecing up, it is necessary to re-punch at least the feed track, possibly in conjunction with a special code.

Unlike the known systems of fluidic tape readers, which retain the conventional driving system, the reader described herein applies a feed principle permitting the advantages of reading without any mechanical engagement of the perforations to be used to the full.

The driving device claimed hereunder is characterized in that it comprises fluidic sensing means and also actuating means controlled by the sensing means for the starting and/or stopping of the tape drive.

The invention is now to be illustrated by way of example with reference to the accompanying drawings, in which:

FIG. 5 shows a control circuit for intermittent tape feed and for processing and generation of further signals, with jet and wall jet elements;

FIG. 9 shows a reading head from the front;

FIG. 10 shows the reading head according to FIG. 9 from above;

FIG. 11 shows the reading head according to FIG. 9 from the side;

The basic idea underlying the fluidic-control tape feed described below consists in that the feed track is relieved of its dual function of meshing rack and signal source for determining the suitable reading position. Considering that the first-mentioned function is practically alone responsible for the known damage to the tape, and considering that the existence of a signal source for determining the suitable reading position is absolutely essential, the obvious approach is to seek some other solution for the power transmission required for the tape feed.

The solution claimed hereunder consists in using a driving system in conjunction with a quick-acting clutch controlled by a fluidic circuit which, besides giving the actual command for tape feed to the next reading position, processes and generates further signals. Of special importance here is the processing of the signal gained from the reading of the feed track.

Put briefly, with various details omitted, the action is as follows: The control circuit receives the command for tape feed to the next reading position and, through a booster, causes the tape to be pressed against a continuously driven rubber roller by means of a free-running wheel of low inertia. As soon as the next feed hole appears opposite the feed track reading nozzle, the said wheel is lifted off, so that the adhesion is removed and the tape thus disengaged. As the tape is continually lightly pressed against the reading nozzles by a spring-loaded bearing block, there is a slight braking force which immediately halts the tape owing to the low inertia of the latter.

Of course, the whole system must work with sufficient speed: Quick engaging and disengaging not only permits high reading rates in intermittent operation, but also saves the tape, as the unavoidable transitional phase involving sliding friction is kept as short as possible. Quick disengaging is especially important in the case of stopping, possibly with transition to intermittent reading, from the forward run: The quicker the disengaging, the quicker can be the forward speed, with the clutch wheel continually pressed into contact, from which it is possible to stop on the spot.

As the feed hole in the internationally standardized eight-track punched tape has a diameter of 1 mm. and as the optimum reading nozzle diameter is of the order 1 mm., the whole system, having a forward speed of 100 reading positions a second, must have a response of 4 msec. maximum.

A special advantage of the pneumatic-fluidic solution is that both feed and reading are effected without any mechanical engagement of the perforations. Considering that this greatly saves the tape, the fluidic reader is the obvious accessory to the photo-electric reader in the low speed range. Moreover, the comparative simplicity and the high resistance to external influences agree admirably with the special economic and practical requirements of the applications hinted at above.

Figure 1:
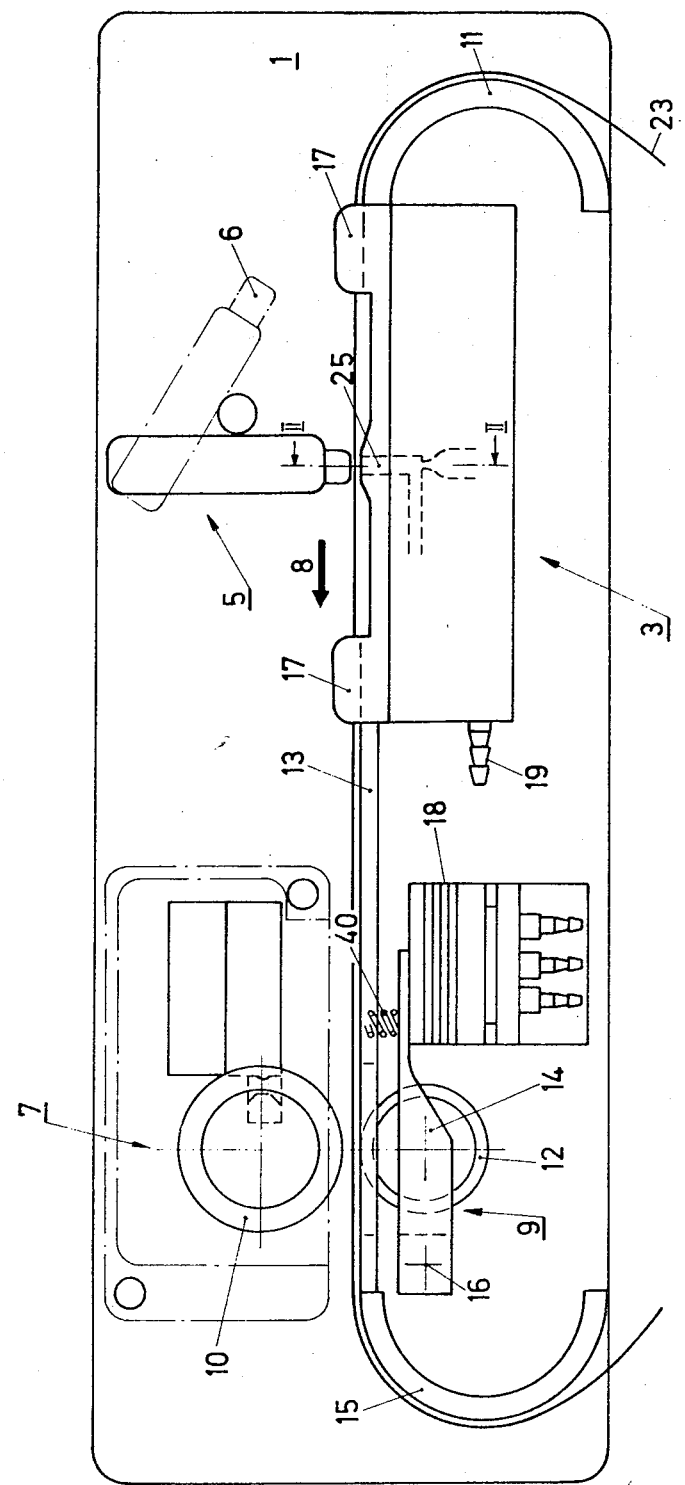
FIG. 1 shows a front view of a tape reader according to the invention, with the wall sides removed.

FIG. 1 shows the arrangement of the essential components of a punched-tape reader, with the exception of the control circuits and the driving motor. Fitted to a baseplate 1, on the right, are a reading head 3 and a pivoted holder 5 carrying a bearing block 6 of low inertia. With the holder 5 in its vertical position the bearing block 6 is pressed downwards against reading nozzles 25 by a spring (not shown) and is slidably supported in a plane parallel to the baseplate 1 and perpendicular to the feed direction 8 of the tape. To ensure an even contact pressure across the whole tape width, the bearing block 6 is also capable of swivelling about an axis parallel to the feed direction 8. Of course, both the bearing block 6 and the tape 23 must also be guided in the direction perpendicular to the baseplate 1. Lateral guides 17 for the tape 23 are shown in FIG. 1; ceramic materials are especially suitable for the purpose.

On the left of FIG. 1, reference 7 indicates a driving unit, and reference 10 a rubber roller driven by a geared motor arranged behind the baseplate. The tape 23, which, when at rest, lies on a reading table 13, is pressed against the rubber roller by a free-running clutch wheel 12, when required. The clutch wheel 12, being part of the clutch unit 9, is mounted on the clutch arm 14 so as to be able to swing about an axis 16 located near the left end thereof. Acting on the clutch arm 14 is a bellows 18 which is pressurized with air of relatively low pressure (about 0.05 to 0.1 g. atm.) and which contains a booster described below.

Figure 2:
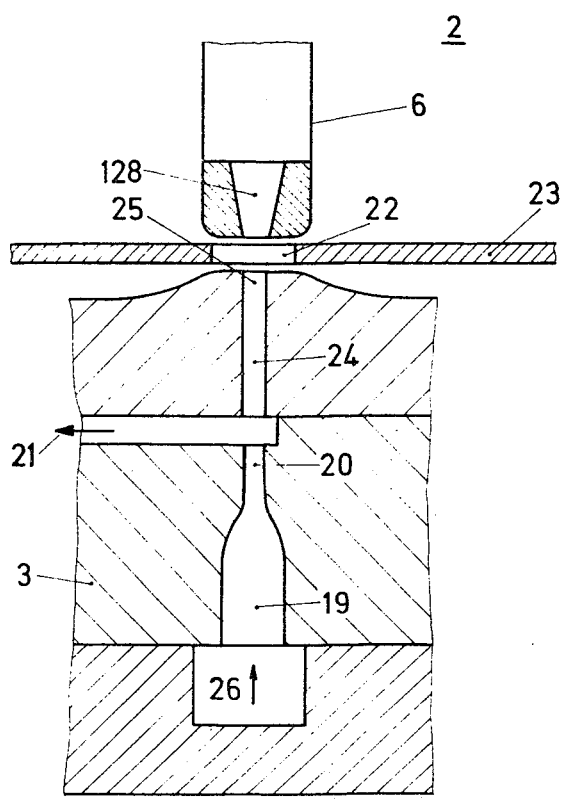
FIG. 2 shows a single reading nozzle in axial section along line II—II in FIG. 1, the nozzles for all eight information tracks as well as for the feed track being identical.
Figure 3:
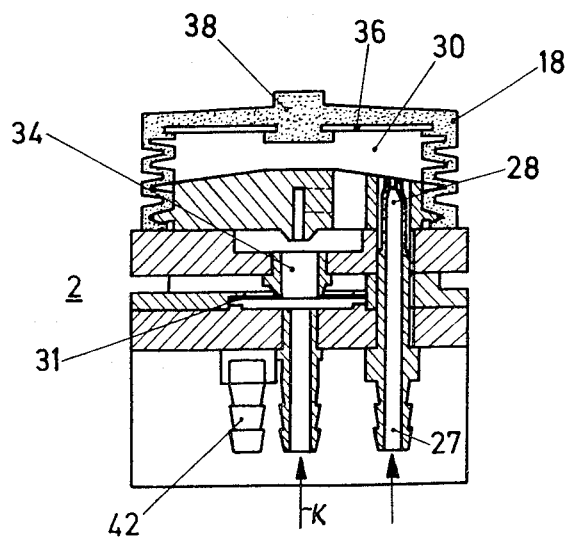
FIG. 3 shows a bellows in section, for clutch operation, with a fitted foil element booster.

Some details of the tape reader are shown in FIGS. 2 and 3. FIG. 2 shows the arrangement for reading a single track (information or feed track). Reference 25 indicates a reading nozzle, 20 a jet nozzle, and 21 a signal channel. In conjunction with the bearing block 6, this arrangement functions as follows: When a hole 22 in the tape 23 is opposite the reading nozzle 25, or if no tape 23 is inserted at all, air flows from the chamber 26 through the jet nozzle 20 into the reading nozzle channel 24 and through the hole 22 in the tape 23, if available, and through a bore 128 in the bearing block 6 out into the atmosphere 2. As the reading nozzle channel 24 has a larger diameter than the jet nozzle 20 and as thereafter neither a narrowing nor a noticeable alteration occurs without a simultaneous considerable enlargement of the cross-section, the whole arrangement acts as a jet pump and produces in the signal channel 21 a pressure which is lower than that of the atmosphere 2. If the bores 128 are designed as diffusers, the negative pressure in the channel 21 can be further increased. However, if the air is sufficiently prevented from leaving the reading nozzle 25 by a blank in the tape 23, the build-up resulting in the signal channel 21 will result in a pressure which, if the support of the tape 23 seals well, will correspond to the jet pressure.

When we select a suitable ratio between reading nozzle diameter and jet nozzle diameter (area ratio not too far from 2:1) and when we further select an operating pressure which, in the jet nozzle 20, produces a Reynold's number causing sufficient turbulence in the reading nozzle channel 24, the negative pressure arising in the signal channel 21 when the outflow from the reading nozzle 25 is free can be of the same magnitude as the positive pressure arising in the reading of a blank.

The maximum rate at which the tape can be read with the arrangement shown in FIG. 2 largely depends on the length of the signal channel 21, but also depends on the load connected or the signal transducer, if any. Rates of 500 positions/sec. can be readily attained, and several kilocycles are at least basically within the range of possibility.

FIG. 3 shows the bellows 18, already mentioned with reference to FIG. 1, together with the fitted foil element booster. The action may be described as follows:

Pressurized air flows from a channel 27 through an inlet nozzle 28 into the interior 30 of the bellows 18 and, in default of a pressure signal on the underside of the foil 31, through outlet nozzle 34 into the atmosphere 2. As the cross-section of the outlet nozzle 34 is considerably greater than that of the inlet nozzle 28, practically the whole pressure drop occurs at the inlet nozzle 28. Any slight residual pressure that might remain cannot push the bellows head 38 with incorporated reinforcing disk 36 and clutch arm 14 (see FIG. 1) upwards against the spring 40, so that the tape lies free between the rubber roller 10 and the clutch wheel 12 (disengaged state). However, when there is an engagement signal K of sufficient amplitude on the underside of the foil 31, the latter is pressed against the outlet nozzle 34. As a result, the air flowing through the inlet nozzle 28 into the bellows 18 is held up. The pressure rises, and so the bellows head 38 and the clutch arm 14 together with the clutch wheel 12 move upwards and press the tape 23 against the rubber roller 10 (engaged state).

A flexible tube connexion 42 communicates through a bore, not shown, with the bellows interior 30. This signal connexion is required in the case of special fluidic control circuits, as will be shown later.

Figure 4:
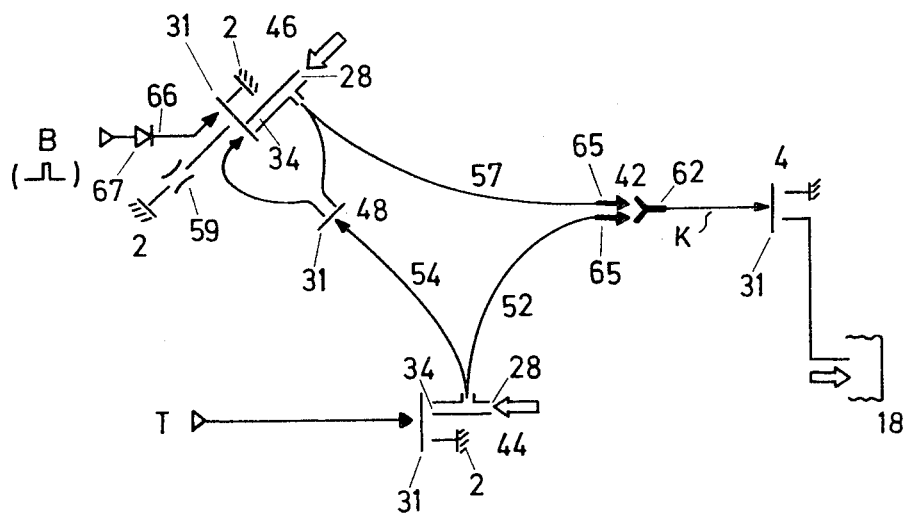
FIG. 4 shows a control circuit for intermittent tape feed, with foil elements.

FIG. 4 shows an embodiment of the control circuit required for the operation of the whole system. Reference 18 indicates the clutch bellows, 4 the foil booster, 42 a dynamic OR gate as a passive jet element, and 44 and 46 two further foil boosters, one of which is in store connexion with the aid of a further (passive) foil element 48.

The action of this circuit is as follows: In the stopped state, a feed hole 22 of the tape 23 lies opposite the reading nozzle (FIG. 2). Accordingly, a negative pressure signal is present in the signal channel. That T-signal (feed track reading) is conveyed to the control input of the booster 44. However, so long as there is no sufficient pressure signal on the control side of the foil 31 of the said booster 44, the supply air flows unobstructed through inlet nozzle 28 and outlet nozzle 34 into the atmosphere 2. As a result, the signal channels 52 and 54 leading from the booster 44 also have negative pressure.

In the booster 46, the air similarly flows through inlet nozzle 28 and outlet nozzle 34 out into the atmosphere 2, as there is no pressure signal on the control side of the foil 31. As a result, the channel 57 leading from the said booster 46 to the OR gate 42 is not under pressure. No air flows through any of the approximately parallel inlet nozzles 65 of the OR gate 42 to the outlet 62 and as engagement signal K on to the control side of the foil booster 4. This situation corresponds to the previously mentioned disengaged state.

Now, when a feed command B in the form of a brief pressure signal is passed to the control side of the booster 46 used in store connexion, the foil 31 is pressed against the outlet nozzle 34. This results at the output in a pressure signal, which is passed to the previously mentioned passive foil element 48, among other components. There is still no pressure signal on the control side of the passive element 48, for which reason the two connexions are interlinked on the other side of the foil 31 of this element 48, because the pressure coming from the booster 46 presses the foil 31 against the control connexion of the element 48. This pressure signal therefore also reaches the control side of the booster 46, which communicates with the atmosphere 2 through a throttle 59. No air can escape through the control channel 66, even in default of a pressure signal B, because the channel 66 is fitted with a foil check-valve 67 which only lets the air pass in the direction towards the element 46. Thus, owing to the pressure drop at the throttle 59, there is a sufficiently high pressure, even in the absence of the B-signal, to press the foil 31 tightly against the outlet nozzle 34 of the booster 46. The particular circuit state is therefore maintained and thus stores the command B. Through the dynamic OR gate 42, the output signal of the booster 46 used in store connexion passes to the input of the booster 4 controlling the pressure inside the bellows 18. According to the previously given explanations, this results in the engaged state. The tape moves (from right to left in FIG. 1), and the feed hole 22 initially opposite the reading nozzle 25 for the feed track moves away. The web between two feed holes now appearing opposite the reading nozzle 25 is interpreted by the reading system as a blank: A pressure signal is given, which, in FIG. 4, is conveyed via input T to the booster 44 serving to boost the feed track reading. The boosted output signal of the said booster 44 passes through the OR gate 42 into the foil booster controlling the bellows 18 and thus assists in maintaining the engaged state; the same output signal also passes to the passive element 48 of the store circuit and interrupts the forwarding of the output signal of the associated booster 46 to the control side, as it presses the foil 31 from the control side with sealing effect against the channel mouths opposite. As a result, the air escapes on the control side of the booster 46 associated with the store arrangement, and the foil 31 of the said booster is lifted from the outlet nozzle 34. As a result, the pressure signal at the store output disappears (erased state of store). From that moment on, the engaged state is only maintained by the output signal of the feed track booster 44.

However, as soon as the next feed hole appears opposite the reading nozzle for the feed track, the pressure signal at the output of the feed track booster 44 disappears, so that the clutch disengages and the tape stops in the new reading position, until the whole cycle is started afresh by a fresh pulse B.

Incidentally, if the tape 23 is withdrawn from the reading position backwards, as by hand, the feed track booster 44 will immediately respond and actuate the clutch, so that the tape will be pulled into the previous reading position again. If the tape is pulled out of the reading position in the forward direction, the clutch will also engage. In this case, however, the tape will be advanced until it reaches the next reading position.

FIG. 5 shows a somewhat more extensive example of a control circuit. Besides the foil element final booster 4, this circuit uses jet and wall jet elements throughout. Instead of using punched tape, though, it is also possible to employ punched disks, with the driving device adapted accordingly.

The symbols used in the drawings correspond to the notation applied in the publication entitled "Digital Fluid Logic Elements" in "Advances in Computers," vol. IV (Academic Press, New York, 1963), by H. H. Glättli. That publication also describes the action of the various elements.

Signals triggering the tape feed to the next reading position can be injected through three different connexions 68. In terms of pressure, the signals should range between a minimum and a maximum, and the rising and falling flanks should be sufficiently monotonous. These requirements allow of great latitude and are easy to fill in practice. It is readily possible to allow deviations of ±40% from the target value by suitably designing the components used in the circuit.

A signal injected through a connexion 68 first passes through a triple OR gate 69 into a control element 70. The OR gate 69 consists essentially of three almost parallel inlet nozzles 71 which are all directed at a capture nozzle 72 at the output. So, if at least one of the inputs 71 is active, there will be a pressure signal at the output 72.

The element 70 is an active "implibitor (compounded from "implicator" and "inhibitor"), i.e. it links two input signals in such a way that the implication appears at the output 73 which is reached by the main jet without deflection. The inhibition then appears at the other output. For the purpose of short and certain identification, the links leading to a pressure signal are given in circuit algebra beside the particular channels or at the outputs of the elements. It should be borne in mind that the positive signal S and the negated return signal R' are injected into the previously mentioned implibitor 70.

The last-mentioned signal R' originates from the implibitor 75. There are two different possibilities of use, according to whether the one output or the other is interrupted at the point X or Y, respectively. If the inhibition output is interrupted at the point Y, as shown, it is possible to link a return signal R and a stop signal in such a way that the stop signal overrules the return signal and thus prevents the further feed of the tape, as will be shown later. If the implication output is interrupted at X, it is possible to link a stop command R' instead of R and a feed command instead of the original stop command in such a way that the feed command overrules the first signal. The first variant shown here is especially suitable for use in conjunction with machine tool control systems.

The output signal $R'+S'$ now passes into the next implibitor 70, where it is linked with the parity check signal P. Again, the main jet can only be deflected from its initial direction when $P=1$ and $R'+S'=0$. Otherwise, the main jet leaves the implibitor through the straight output marked with a dot (implication). P is $=1$ when the parity is found to be in order by a further circuit not part of the invention hereunder claimed.

The output signals PRS and $P'+R'+S'$ of the last-mentioned implibitor 76 then pass to a bistable element 77. The main jet of the latter switches abruptly from one side to the other when the signal at the input on the first side exceeds the signal on the other side by a specific value. Irrespective of whether the original signals had steep flanks or not, there are now square signals at the two outputs of the bistable element.

The signal available at the lower output of the bistable element 77 passes to a bibivalent element (compounded from bi-twofold, inhibitor and equivalence) 78, in particular directly through a short channel to the one input of the said element 78, and through a somewhat longer channel U to the other input, so that a throughput time difference of preferably 1 to 3 msec. arises. The bibivalent element permits the concurrent generation of two inhibitions and the equivalence. The main jet goes straight to the middle output when there are simultaneously either "0" or "1" signals at the two inputs, which state would be that of equivalence. The jet only leaves the element through a side outlet when there is a "0" signal (= no pressure) at the input on the particular side and there is at the same time a "1" signal (= pressure) at the input on the other side.

Only the low inhibition output of the bivalent element is used. This supplies a pressure signal during the time that there is only a "1" signal at the upper input. The square signal PRS from the bistable element 77 is thus passed on in shortened form to another bistable element 79. This element corresponds in action to the store arrangement comprising the elements 46 and 48 in FIG. 4, while the shortened signal PRS is to be equated with the short pulse B in FIG. 4. The succeeding triple OR gate 80 corresponds to the double OR gate 42 in FIG. 4. The third input permits the additional injection of a command V for the forward run.

The output signal of the OR gate 80 is not passed directly to the foil element booster 4, but first to a bistable wall jet element booster 81. If the main jet thereof has been switched to the right, the particular output signal K (= engaging signal) will be boosted by the foil element booster 4, so that the clutch bellows 18 will be pressurized.

Leading from the clutch bellows 18 is yet another channel 82 of small cross-section, passing to the second input of the bistable wall jet element booster 81. That channel 82 has the following function: Once the main jet of the wall jet element booster has been switched to the right, switch-back to the left would only be possible by applying a strong negative pressure signal to the left input. This, however, involves difficulties, owing to the OR gate 80 preceding. However, when the pressure signal present in the bellows 18 is passed through the channel 82 with sufficiently high resistance, the signal arriving at the right input cannot switch back the bistable element so long as there is still a "1" signal at its left input. But when the latter disappears, the main jet is immediately switched to the left, causing the clutch to disengage.

In analogy with the behaviour of the circuit shown in FIG. 4, the (shortened) feed command PRS is stored by a bistable wall jet element 79 during a first feed phase of the tape (in particular until the moment when the feed hole moves away from the reading nozzle). The feed signal T ensures that the clutch remains engaged until the next feed hole appears opposite the reading nozzle.

It would of course be possible to pass a constant pressure signal to the right input of the wall jet eelment output booster 81. But then considerably stronger signals would be necessary at the left input to switch the main jet to the right side. The signal gained from the bellows 18 has the advantage that it does not exist at the beginning, thus facilitating the engagement of the clutch.

However, the circuit shown in FIG. 5 does not only serve to control the tape feed. The bistable element 77, which serves to generate signals with steep flanks, and the bistable wall jet element output booster 81 each process the (negated) signal present at the second output. The negated engaging signal K' is passed to another implibitor 83, where it is linked with the negated parity check signal P'. One of the resulting output signals, in particular PK', could be readily used to permit by means of a multi-channel gate, the read signals to pass for further processing only on condition that the clutch is disengaged and the parity found to be correct. This ensures that the tape is in a suitable reading position (otherwise the T-signal would engage the clutch) and prevents simple punching or reading errors.

The linking of the signal P'+K with P'+R'+S' (from the element 77 serving pulse shaping) in a last implibitor finally produces the output signal A, and the negation thereof. The signal A obviously still contains R and S. In accordance with the term PK' (R'+S'), it is possible to make the relative ON time of the signal A at R=1 depend on S, or, in the case of the constant signal S, the return signal alone can be used to trigger the further feed of the tape and the activation of A. The signal A equals 1 so long as no return signal is present. As soon as the latter arrives, the tape is fed along.

Figure 7:
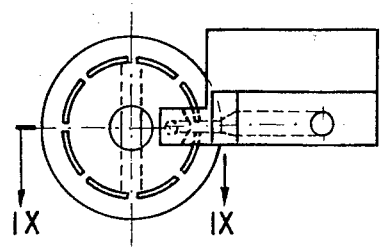
FIG. 7 shows a general view of the pulse generator shown in FIG. 6.

Of special interest is the possibility of producing signals which are suitable as to frequency and relative ON time by means of a synchronous motor which concurrently serves tape feed. For this purpose, a generator for producing pneumatic pulses is fitted into the driving unit 7 (see FIG. 1). The particular arrangement is shown more particularly in FIGS. 6 and 7.

Figure 6:
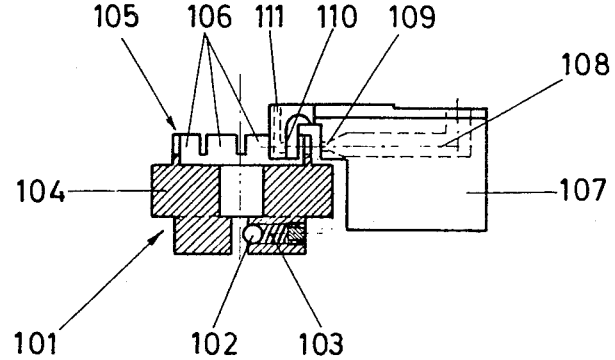
FIG. 6 shows a pulse generator viewed from above, with components in horizontal section.

The rubber roller 10 already indicated in FIG. 1 has the form of a small wheel 101 in FIG. 6, which is easy to slip onto the shaft on the driven side at an angle perpendicular to the baseplate 1 (not shown), so that it engages a groove by means of a ball 102 loaded by a spring 103 and thus fixes the position in the axial direction. The entraining of the wheel 101 is best ensured by a keyway or the like. The wheel first carries the rubber ring 104 serving the drive. An the side facing away from the observer (rear side) in FIG. 1 (above in FIG. 6), however, the wheel 101 also carries a toothed rim 105 whose teeth 106 can interrupt an air jet. The particular nozzle arrangement is accommodated in a separate block 107. The air flows through a channel 108 to a jet nozzle 109 and thence, unless obstructed by one of the teeth 106, to a capture nozzle 110. From the latter, the air passes through a channel 111 to a connexion fitted to the baseplate and finally to the input S of the control circuit shown in FIG. 5.

In conjunction with the driven-side speed of the transmission, the number of tooth gaps determines the frequency of the feed commands given. By making the teeth narrower or broader within the sector available, it is possible to vary within wide limits the relative ON time of the actuation signal in the presence of a return signal. Owing to the easily attachable wheel, frequency and/or relative ON time can be varied quickly.

Figure 8:
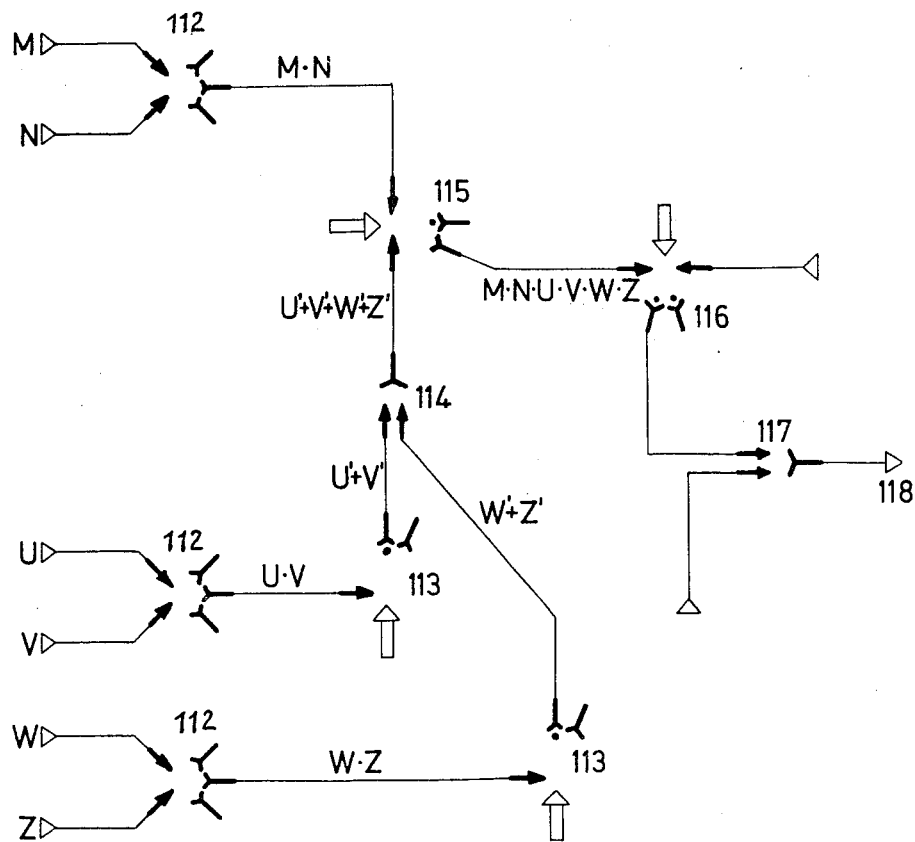
FIG. 8 shows a code recognition circuit.

FIG. 8 shows a further circuit accessory, in particular a code recognition circuit permitting to switch from fast forward run to intermittent operation or to stop at predetermined places by punching a particular hole combination. It handles the six signals M, N, U, V, W, Z. This purpose is served first by three identical passive bibikon elements 112 on a jet basis (compounds from "bi"-twofold, inhibition and conjunction).

Only the AND link (= conjunction) is used. The signals U, V and W, Z are then each passed to a negity element 113 (compounded from negation and identity). This element is a booster which concurrently produces two output signals, viz one identical and the other negated with respect to the input signal. At least in a symbolic manner, an implibitor becomes a negity element when the signal input which is on the side of the output which can only be reached by the deflected jet is either omitted or not used.

In the present case, only the negated output signal is used in each case. The corresponding signals U'+V' and W'+Z' are passed through an OR gate 117 of the same type as the element 42 used in FIG. 4 to the overruling input of an implibitor 115. At the output attainable by the deflected jet, the signal M.N.U.V.W.Z is available. This signal is used to switch a bistable wall jet element 116 to the unused output if it was previously switched to the other output, manually or otherwise. Otherwise, the jet remains on the side near the right diagram edge.

The output signal of the bistable element 116 is passed to an OR gate 117 of the same type as the other OR element in this circuit. Also leading into the said OR gate 117 is a channel through which a manually generated signal can be transmitted. As a result, there is present at the output 118 a signal V which can be injected into the circuit mentioned with reference to FIG. 5 (in particular into the yet free input of the triple OR gate 80 directly before the bistable output booster 81 for generating the engaging signal).

When the reading signals are designated according to the track number, the signals 5', 6',7', 8', for instance, can be substituted for U, V, W, Z. For the parity check circuit, to be discussed elsewhere, it is possible without additional effort to extract the links 1.3' and 2.4' and inject them as M and N respectively into the code recognition circuit (1 meaning that a hole is being read in track 1 and there is therefore a pressure signal available).

As the signal V keeps the clutch continually engaged, the reading of the combination 123'4'5'6'7'8' results in the forward run being switched to intermittent reading or stopping.

Summing up, the following can be said in respect of the arrangement shown here together with the circuits:

The reading arrangement permits the tape to be read without any mechanical engagement of the perforations. In conjunction with control circuit and drive, the tape can be fed intermittently or continuously, again without any mechanical engagement of the perforations. It is not necessary to maintain accurate spacing between succeeding feed holes either in the punching or in the piecing-up of tapes. The only important point is that a minimum space, which may be appreciably smaller than the international standard value of 1/10 inch, must be exceeded. When the tapes are pieced up with adhesive tape, the feed track need not be punched along if there is no information to be read at that point; tape portions without perforations in the feed track are skipped in a single go at forward speed. The control circuit permits various variables, in particular return signals, stop or feed and parity check signals to be linked up. If the parity is wrong, it is possible to interrupt either the feed or the activation signal or both together, as required. By means of a signal generator, possibly driven by a synchrous motor, it is possible to vary the rate of the single steps by more than a factor 10, simply by changing the small wheel. Moreover, the relative ON time of the activation signal, which is also generated in the control circuit, can, in the case of a continually present R-signal also be varied by varying the tooth widths of the pulse generator. The possibility of synchronizing several readers through the alternating current mains is just as feasible as that of exact timing. The activation signal is linked by the (negated) engaging signal with the position of the tape, thus preventing any reading errors in the transition from one hole position to the next.

The above-described fluidic tape reader can of course be presented in a number of variants. By way of a further detail, FIGS. 9 to 11 show another three views of the reading head. Reference 25 indicates the reading nozzles arranged in a raised portion of the reading table, reference 20 indicates the jet nozzles, 21 the output channels, and 26 the air supply chamber. Also shown are the lateral guides 119 for the tape.

Figure 12:
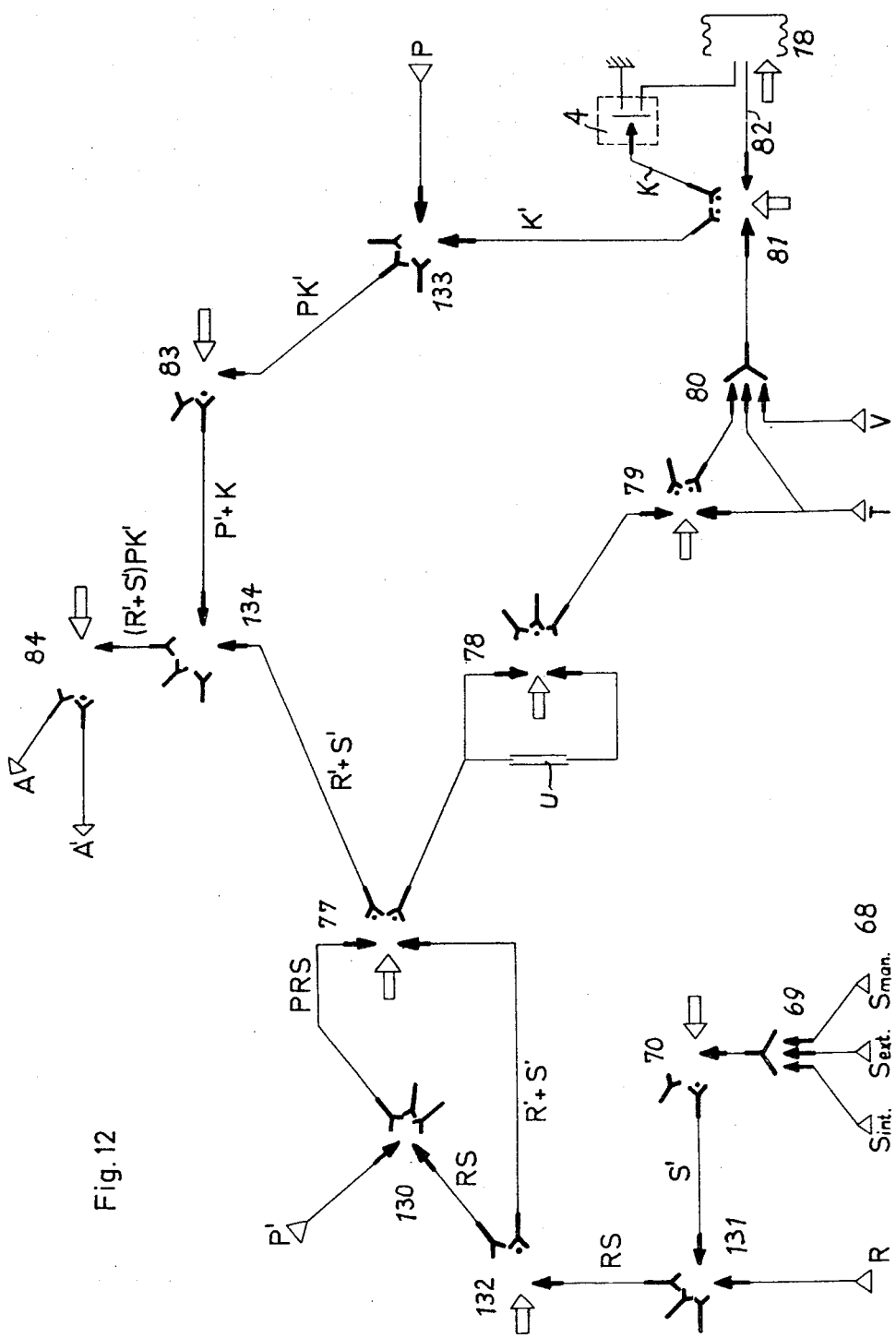
FIG. 12 shows a variant of the control circuit shown in FIG. 14.

FIG. 12 shows a variant of the control circuit. It only comprises elements such as have already been discussed with reference to FIG. 5. The logic links are essentially the same, but no over-ruling stop or feed signal is processed. An extension in this respect is readily feasible. In undisturbed operation, the information medium is fed along when a synchronizing signal S arises. This signal passes through the pulse shaper 78 and sets the bistable element 79. As a result, the bistable element 81 is also switched on, starting the driving device for the information medium. During the feed of the information medium, the feed track brings about a signal T which resets the bistable element 79 and keeps the element 81 switched on in order to maintain the feed motion. As soon as the next feed hole in the information medium is sensed, the signal T disappears, thus stopping the drive.

When the signal read from the information medium has taken on another value, a brief drop may occur in the parity signal. This impulse may cause a disturbance if the gap width on the toothed rim 105 is such that a synchronizing signal S is still being generated. In this case, the interruption of the parity signal P causes a brief impulse in the bistable element 77 which runs through the pulse shaper 78 and sets the element 79 again, as the signal T does not arise. Then the drive would be restarted or simply not stopped, as this disturbing pulse in the parity signal arises at about the same time at which T disappears.

This problem does not arise when the S-signal is of short duration. Then the S-signal has already disappeared by the time the disturbing pulse arises, so that the bistable element 77 does not respond.

To avoid the disturbing effects mentioned, the arrangement shown in FIG. 12 is modified with respect to that shown in FIG. 5 in the following manner:

When a return signal R arises, a bibikon element 131, used as a gate circuit, generates an output signal whenever a synchronizing signal S arises. Having passed through an element 132, the signal is passed to a gate element 130, where it is switched by the negated parity signal P'. The resulting signal and the second output signal of the element 132 are passed to the bistable element 77. In these circumstances, in the case of long synchronizing signals S, a short pulse P' through the output of the gate element 130 will only generate a brief pulse drop in the element 77, but such drop will not alter the switching state thereof. Thus, the state of the clutch will not be altered.

The rest of the arrangement comprises bibikon elements 133 and 134 used as gate circuits, whose function has already been described with reference to FIG. 5. The advantage of the circuit shown in FIG. 12 is that signals with yet greater tolerances can be processed.

Figure 13:
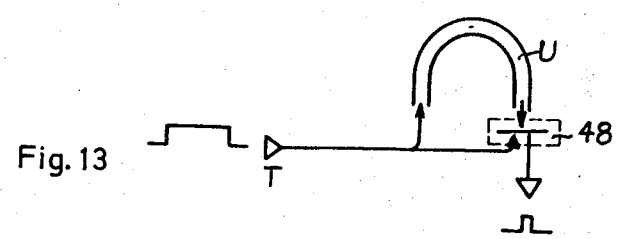
FIG. 13 shows a pulse-shortening arrangement with delay line and foil element inhibitor.

FIG. 13 shows an arrangement with a foil element for the purpose of generating short pulses. The same passive element 48 as that in the store arrangement according to FIG. 4 is used. In addition, however, there is a bypass channel U acting as a retarder.

The control circuits shown can also be readily combined with a purely pneumatic drive.

Figure 14:
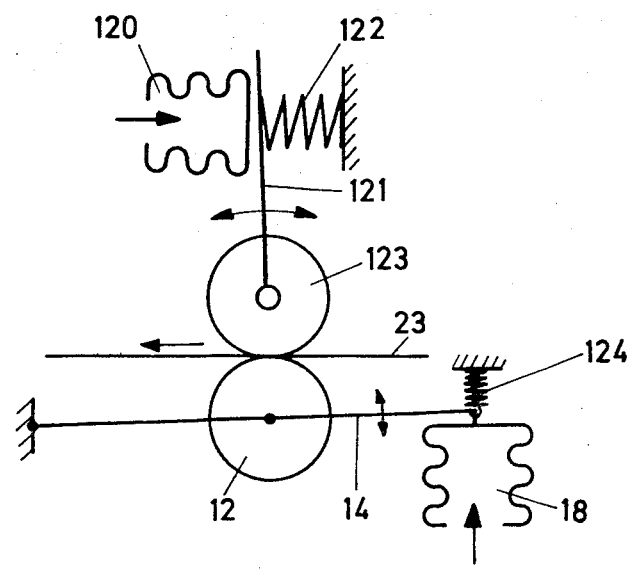
FIG. 14 shows a pneumatic driving system for punched tape.

The arrangement shown in FIG. 14 has two bellows. The upper bellows 120 rotates a rubber roller 123 clockwise by a lever 121 against the action of spring 122 when it is pressurized. At the same time, the lower bellows 18 is also pressurized, so that the tape 23 is engaged by the clutch arm 14 and the clutch wheel 12 and moved to the left. As soon as the next feed hole appears opposite the reading nozzle for the feed track, the bellows 18 and 120 are depressurized. The tape 23 is disengaged by the action of a resetting spring 124 for the clutch arm 14, and the rubber roller 123 is rotated back idle by the spring 122. Of course, the bellows 120 must have a sufficient stroke, and the lever 121 for the drive of the rubber roller 123 should be short enough to permit the tape to move along with certainty until the next feed hole is read. For this purpose, it will in most cases be necessary to perforate the joints of tapes pieced up with adhesive tape.

Both bellows 18 and 120 can be tripped directly and simultaneously by one of the control circuits shown or by a further variant. However, it is also possible to trip only one bellows and use the signal gained therefrom not for the purpose of resetting the bistable output booster in FIG. 5, but rather for the purpose of tripping a further foil element booster for the second bellows. From this, if necessary, a resetting signal can be extracted for the bistable wall jet element for generating the engaging signal. In order to avoid an idle stroke, it will be advisable to pressurize first the bellows 18 serving engagement.

Figure 15:
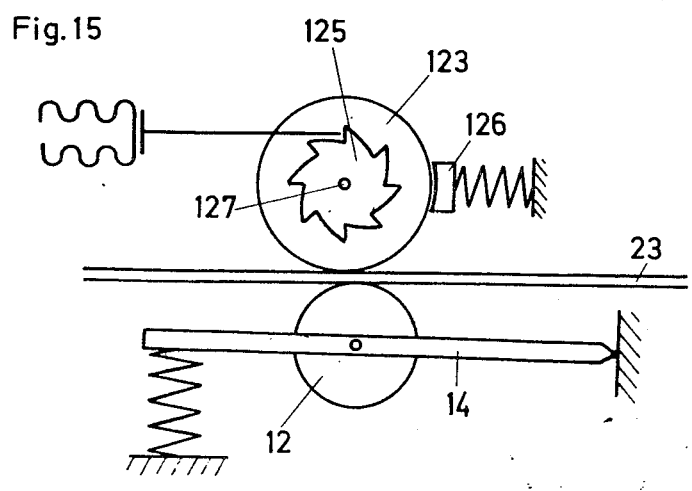
FIG. 15 shows a variant of the driving system shown in FIG. 14.

FIG. 15 shows a purely pneumatic drive with only one bellows. This is achieved by a free-wheel arrangement 125 on the shaft 127 of the rubber roller 123 in conjunction with a brake 126. In this case, the tape 23 remains permanently engaged by spring pressure on the clutch arm 14.

The purely pneumatic drive is especially recommended in cases where full explosion safety is required.

With the driving system used, fast motion is only possible over a distance of few reading positions, unless gearing or pneumatic rotating motors are employed.

The maximum reading rate of the tape reader described above is 100 positions/sec. for continuous feed, and 30 positions/sec. for intermittent operation. The drive is by a rubber roller which is continuously driven by a synchronous motor and against which the tape is pressed by a free-running wheel operated by a quick-acting clutch. Apart from the contact of the tape with the rubber roller, there are no further effects on the tape. In particular, there is no mechanical engagement of the perforations even in reading, as the reading of the tape is effected by air jets issuing from special nozzle arrangements. This system ensures minimum tape wear and correspondingly long tape life. Even for ordinary paper tapes, a minimum of $10^4$ to $10^5$ passes can be taken as typical.

Integrated fluidic circuits with jet and wall jet elements, in conjunction with the reading arrangement for the feed track, drive and clutch systems and the tape itself, form a self-contained control circuit.

In addition, the system generates an actuation signal which can be used in conjunction with the information read from the tape for the synchronous emission of the reading signals. Further fluidic switch elements link various signals, such as feed and stop commands, return signals and parity check signals. The latter are produced by a fluidic integrated circuit which is also incorporated and which permits the check to be made for even or odd, as required. Finally, another fluidic circuit permits reception and storage of a forward signal and switch-back to intermittent reading by reading and recognition of a particular signal during the forward run.

What is claimed is:

1. A driving device provided with a control system and a driving means for use in an information reader designed for information media having the form of punched tapes or disks, comprising:

fluidic sensing means having at least one fluidic reading head permitting the position of the information medium to be determined;

said reading head having at least one channel which is adapted to be pressurized by fluid pressure and near whose mouth the information medium moves during operation, the arrangement being such that a positional and/or geometrical alteration of the information medium influences the pressure and/or flow conditions in said channel;

said channel having a lateral branch channel which transmits pressure changes and/or flow changes arising in said channel;

a jet nozzle positioned upstream of said channel and said channel having a cross-section which is smaller near said branch channel than the cross-section of said jet nozzle; and actuating means controlled by said sensing means for the purpose of engaging and/or disengaging the driving means of the information medium.

2. A device according to claim 1, wherein said actuating means causes a clutch to respond.

3. A device according to claim 1, wherein said driving means when feeding the information medium is connected with the information medium with power-transmitting effect by at least one friction element.

4. A device according to claim 1 wherein the cross-section ratio between said channel near said branch channel and said jet nozzle is smaller than 1 but greater than 1:5.

5. A device according to claim 1 further comprising a counterbearing which presses the information medium against the mouth of said channel.

6. A device according to claim 5 wherein said counterbearing is movably arranged.

7. A device according to claim 5 wherein said counterbearing is provided with a bearing channel which is opposite the mouth of said channel, whereby the pressure in said branch channel is reduced when the fluid flows through a hole in the information medium.

8. A device according to claim 1 wherein said driving means is operatively connected with a pneumatic impulse generator which comprises a slotted wheel, a perforated wheel or a perforated disk and also an air barrier.

9. A device according to claim 8 wherein said barrier is controlled by said slotted wheel.

10. A device according to claim 1 wherein said reading head is provided with an air barrier.

11. A device according to claim 1 further comprising a command generator whose signals cause the information medium to be moved along to the next reading position.

12. A device according to claim 11 further comprising means for processing the reading signals and the signals of said command generator in such a manner that if a feed command is available or if the information medium is in an intermediate position, the information medium is moved along into the next position defined by a marking.

13. A driving device for use in an information reader designed for punched information media comprising:

driving means, including a clutch with at least one friction element for driving said information medium, said driving means being connected to the information medium with power-transmitting effect by said friction element;

fluidic sensing means having at least one fluidic reading head for permitting the position of the information medium to be determined;

control means for providing pressure signals; and actuating means connected to said fluidic sensing means and said control means for causing said clutch to respond and engaging said driving means when one of said pressure signals is given and disengaging said driving means in response to the position of the information medium.

14. A device according to claim 13 wherein said control means includes an impulse generator or a reading head with an information medium, the arrangement being such that the pressure signal is generated between two successive markings of the information medium.

15. A device according to claim 13 wherein engagement of said driving means by said actuating means, besides requiring said pressure signal, also requires at least another parity signal and/or a return signal.

16. A device according to claim 13 further comprising means for processing at least another stop pressure signal, preventing operation of said driving means.

17. A device according to claim 13 further comprising means for processing an overruling stop signal for the control of said drive actuating system.

18. A device according to claim 13 further comprising means for generating at least one actuating no-drive signal in such a manner that said actuating signal is only available when there is no signal from the impulse generator.

19. A device according to claim 13 further comprising means for the triggering only a single feed step of limited distance in the case of an impulse of arbitrary length.

20. A device according to claim 13 further comprising means for generating a negated signal and/or an actuating signal, and said means respond in the case of no drive.

21. A device according to claim 13 wherein said control means and actuating means include the following elements: jet element, wall jet element, foil element, bellows element, plunger valve, and a diaphragm element.

22. A device according to claim 1 wherein said actuating means comprises at least one bellows element into which is fitted a foil booster.

23. A device according to claim 13 further comprising at least one element acting as a store and at least one double OR gate.

24. A device according to claim 23 further comprising at least one impulse shortener with a delay line and an inhibitor.

25. A device according to claim 23 further comprising an impulse shaper.

References Cited

UNITED STATES PATENTS

| | | | |
|---|---|---|---|
| 3,049,598 | 8/1962 | Lannan et al. | 226—43 X |
| 2,246,968 | 6/1941 | Antrim | 226—35 X |
| 3,057,974 | 10/1962 | Cohen | 235—201 FS |
| 3,332,084 | 7/1967 | Wahrer et al. | 226—9 X |
| 3,069,666 | 12/1962 | Austin | 226—33 |
| 3,270,960 | 9/1966 | Phillips | 235—201 FS |

ALLEN N. KNOWLES, Primary Examiner

G. A. CHURCH, Assistant Examiner

U.S. Cl. X.R.

226—35, 43, 45